3,712,802
COMPOSITION AND METHOD FOR TREATING PLANTS AND TREES

Roland S. Grybek and Frederick B. Johnston, Tampa, Fla., assignors to Marketing and Research Services, Inc., Coral Gables, Fla.
No Drawing. Continuation-in-part of applications Ser. No. 417,215, Dec. 9, 1964, and Ser. No. 804,717, Mar. 5, 1969. This application June 2, 1969, Ser. No. 829,771
Int. Cl. A01n *5/00*
U.S. Cl. 71—79     10 Claims

ABSTRACT OF THE DISCLOSURE

A growth promoting composition influencing growth and yield of ornamental and food-producing plants and vegetables is provided by controlled oxidation of partially hydrolyzed proteinaceous materials. A correlation has been observed between activity and the formation of alpha-keto acids in the product. The composition has also been found to unexpectedly lend substantial freeze resistance to plants. It has been hypothesized that the composition acts as an initiator or "trigger" for plant metabolic reactions.

---

This application is a continuation-in-part of application Ser. No. 804,717, filed, Mar. 5, 1969, and of application Ser. No. 417,215, filed Dec. 9, 1964, both now abandoned.

This invention relates to a composition effective to promote growth and yield of ornamental and food-producing plants. It further relates to a process whereby such a composition can be produced. Still further, the invention relates to the conversion of proteinaceous materials into a composition effective to promote growth and yield of useful plants. An additional object is the provision of a composition which imparts freeze resistance to useful plants. More particularly, this invention relates to the treatment of proteinaceous materials to provide conversion of a least a portion to alpha-keto acids by hydrolysis and mild oxidation, whereby there is provided a composition effective to both promote growth and impart freeze resistance to useful ornamental and food-producing plants.

The desirability of means for promoting rapidity of maturation and yield of food crops is well known in light of increasing concern over the so-called population explosion, the ubiquitous prophecies of imminent world crises devolving from food shortages, and the current extent of malnutrition existing in the world. The extensive economic impact of crop failures and shortages due to frost and freeze damage is also well-known, and effective means to impart freeze resistance is obviously equally desirable.

Plant growth promotors, unlike common fertilizing compositions which supply nutrients, act to stimulate or initiate the metabolic reactions of the plant. Such promotors are known to the art. For example, certain natural and synthetic auxins and gibberellins have been suggested. While such materials do confer certain desirable effects upon growth rate and yield, these are usually of short duration and limited in scope of effectiveness. Such materials as are known to the prior art are generally rather difficult to prepare, expensive, and require substantial and frequent additions. The growth promotors of the prior art are also not known to impart subsidiary benefits such as freeze resistance to the plants.

It is accordingly an object of the present invention to provide a growth-promoting composition for useful plants.

It is a further object to provide a composition for imparting freeze resistance to useful plants.

A still further object is to provide a method for the preparation of a growth promoting composition effective to impart freeze resistance to useful plants.

Another object is to provide a composition derived from waste proteinaceous materials effective to promote growth of and impart freeze resistance to useful plants.

Another object is to provide a method for treating proteinaceous waste materials to provide a growth promoting composition for plants.

These and still other objects, which will become apparent from the following disclosure, are provided by the present invention.

It has been found that the foregoing objects are realized by treating proteinaceous material, such as waste proteins, to hydrolyze the proteins and subjecting the hydrolyzed material to oxidation under controlled conditions whereby alpha-keto acids are produced. The composition provided thereby is an effective promotor of growth for ornamental and food-producing plants and is further and unexpectedly effective to provide freeze resistance to such useful plants. The composition is effective in relatively minor amounts and for longer periods of time when compared with other known growth promoting compositions, and has a suprisingly broad spectrum effect on useful plants generally rather than specific applicability to a particular type of plant. Among the particular advantages provided by the composition of the present invention, the following have been noted: accelerated growth, shortened maturity time, initiation of flowering and fruition under adverse conditions, extended blossom and fruit retention, more uniform maturation and ripening, with consequent advantages in machine harvesting or hand picking, increased resistance to fungal or insect pests, greater retention of moisture and consequent resistance to drought and extremes of temperature, production of larger, more colorful blossoms and more lush foliage, substantially increased yield of fruits, vegetables, and other food crops, distinct improvement in texture, flavor, and appearance of fruits and vegetables, and superior resistance to spoilage and decay of mature fruits and vegetables after harvesting.

The proteinaceous material which constitutes the starting material in the process for the preparation of the growth promoting composition can be derived from any source of proteins, although for economic purposes and ready availability, it is often desirable to utilize proteinaceous waste materials, with the consequent elimination of the problems attendant upon disposal of such wastes. Such readily available waste materials include slaughterhouse scrap, leather processing tankage, cereal grain waste and distillery residues, trash fish and seafood processing discards, cottonseed meal and the like. Such materials often contain about 5 to 20 weight percent of protein based on the dry weight of the solids content, and about 1 to 5 weight percent on an undiluted wet basis. The only necessary prerequisite for such materials is that they shall not have been subjected for any prolonged period to temperatures above about 60° C., i.e., the amino acid components of the proteins must be substantially intact. The preferred source of protein is fish, particularly inexpensive trash fish, such as mullet, menhaden, bunker, and the like. Particularly preferred trash fish include black mullet. Apart from considerations of ready availability and low cost, fish with higher oil content have been observed to provide better results. The reason for the effect of the oils is not completely understood.

The basic proteinaceous starting material is first size reduced, as by maceration or grinding, until in water suspension it forms an easily handled slurry with a convenient amount of water. The proteins are then hydrolyzed to a soluble condition, e.g., by the addition of a mineral acid and stirring or otherwise agitating for a period of about two to six hours at a temperature of about 20 to 80° C. It is desirable to hydrolyze at least about two-thirds, preferably substantially all, of the available protein. About one pound of 75% phosphoric acid is effective to hydrolyze about one pound by dry weight of proteinaceous material. In the event that bone matter or other materials are present which would react with the free mineral acid, a sufficient excess of the acid must be provided to insure hydrolysis of the proteins. In addition to the use of mineral acids, enzymatic hydrolysis can also be used where conditions are advantageous, but alkali hydrolysis can result in racemization of the amino-acids and is accordingly undesirable.

The extent of hydrolysis is readily determined by treating an aliquot sample of the hydrolysis slurry with an equal volume of 10% trichloroacetic acid, followed by centrifugation. The volume of the resulting precipitate, when compared to the original unhydrolyzed slurry, gives an approximate volumetric determination of the remaining unhydrolyzed protein.

A number of materials, such as oils and the like, are ordinarily released during hydrolysis, but such materials are non-phytotoxic and, in fact, may contribute beneficial effects to the composition, and are accordingly not separated from the slurry.

Upon completion of the hydrolysis, the mixture is subjected to a mild oxidation effective to convert the amino acids to alpha-keto acids. Any mild, controlled oxidation will generally be effective, but the following three have proved exceptionally convenient and effective:

(A) The substantially hydrolyzed proteinaceous mixture is treated with nitrous acid, or sodium nitrite with gradual addition of a mineral acid, with continuous agitation at a temperature of about 20 to 80° C. for a period of about two to eight hours.

(B) The hydrolyzed protein slurry is continuously agitated in the presence of an aldehyde, such as acetaldehyde or hydroxy-benzaldehyde, at reflux conditions at a temperature of about 20 to 80° C. and reduced pressure, while air or oxygen is continuously bubbled into the mixture. The reaction is continued for a period of about two to eight hours, or until any alkyl-amino intermediates formed are removed by deamination. All unreacted aldehyde must be removed during the refluxing.

(C) The hydrolyzed mixture can also be oxidized with nascent air, oxygen, or hydrogen peroxide in conjunction with certain catalytic methoxy compounds, including guaiacol and vanillin, for example. Such compounds can be naturally occurring or synthetic and can be used singly or in combinations. The reaction is conducted with vigorous agitation and at a temperature of about 20 to 80° C. for a period of about two to eight hours.

The foregoing oxidation processes are known in the art, as are other techniques. The choice of particular technique and variations of conditions are a matter of convenience, although the described methods are preferred for ease and effectiveness. The oxidation is characterized by the conversion of the alpha-amino acids of the hydrolyzed mixture to alpha-keto acids. The production of alpha-keto acids is readily monitorable qualitatively by electrophoretic paper chromatography, using 2,4-dinitrophenol as the indicator, in techniques well known in the art. An effective quantitative method is as follows:

A 5.0 ml. sample of the oxidation product is adjusted to a pH of 8.0 with 1.0 N KOH, combined with 2 ml. 20% trichloroacetic acid, and filtered. One ml. of 2.4 dinitrophenyl hydrazine in a half-saturated solution in 1.0 HCl is added to the filtrate and allowed to set for 5 minutes. Then 10 ml. of 2 N NaOH are added, the sample is diluted to 25 ml. and read with a #52 Filter on a photoelectric colorimeter and compared with a standard curve prepared with oxoglutaric acid solution. Where extraneous conflicting colorants are present, it can be advantageous to back titrate to a matching color with a dilute oxoglutaric acid solution.

At least about 0.01% by weight of the peptides and amino acids resulting from the hydrolysis are converted to alpha-keto acid form. Preferably, about 0.01 and 10.0% by weight are converted to alpha-keto acids.

The oxidized mixture is adjusted to a pH between 5.0 and 7.0 and filtered or decanted. The neutralized reaction product can then be adjusted to a convenient concentration for direct application as a foliar spray, or applied to the root zone of plants without separation of the insolubles content, in which case the solids can serve as a useful reserve of slowly degrading proteins and phosphates to supply nutrients to the plant. The product can be dried and handled in many convenient fashions, in liquid solution, slurry, or in solid form, either alone or in admixture with other agricultural chemicals and adjuvants, such as, for example, compatible wetting agents, inert carriers, spreaders, stickers, pesticides, nutrient fertilizers, and the like. The effective amount to be used to obtain the benefits of the composition is very small, such as about 1.0 to 20.0 pounds per acre on a dry basis. A very effective application is about 6 pounds per acre, which corresponds to 1 fluid once of a solution containing 0.75% by weight solids per plant, or about 0.01 to 0.03 gram, on a dry weight basis, per plant, when the plants are located at two foot intervals, typical of, for example, tomato plants. When larger plants or trees are treated, somewhat larger amounts will be used, e.g., up to about 0.5 gram, on a dry weight basis, of the reaction product per plant.

The mechanism by which the growth promoting composition of the present invention operates appears to depend upon sorption of the material by the treated plant. Since the oxidation of the amino acid moieties of the hydrolyzed protein mixture is requisite to the production of an active material, it is postulated that the effect is provided by alpha-keto acids formed from the many amino acids occurring in proteins; such amino acids are well known and include, for example, tryptophane, phenyl alanine, tyrosine, and the like. The level of activity of the product can be directly correlated with the development of the alpha-keto acids.

The simple alpha-keto acid, oxaloacetic acid, formed by deamination of aspartic acid, is known to be associated with important respiratory pathways of plant metabolism, such as the Krebs citric acid cycle, figuring significantly in carbohydrate catabolism and in photosynthesis. Limited investigation of synthesized alpha-keto acids tend to verify that these are the active ingredient of the composition of the present invention. Such preparations are prepared only at great expense, however, and complete verification has not been possible. None of the acids tested, singly and in combination, have approached the overall effectiveness of the product of the present invention, prepared from whole proteins. This suggests that the product of the present invention represents a more complete balance of components or a better potentiated product. Applicants do not, however, intend to be bound by this or any other theory concerning the active species or the mode of operation of the composition of the present invention.

In order to clearly illustrate the preparation, utilization, and effect of the product of the present invention, the following examples are provided. They should not be construed as limiting, but rather as indicative of the benefits to be derived through the present invention.

EXAMPLE I

Ten pounds of meat scraps (15% dry weight) is hydrolyzed to the extend of about 70%, using one pound of 75% phosphonic acid at about 60° C. for 4 hours. After neutralizing with 10% KOH (to pH 7.0), one pound of sodium nitrite is stirred into the mixture (about two gallons of slurry) in a loosely covered vessel. The temperature is maintained at about 50° C. with continuous stirring, and 8 ounces of concentrated hydrochloric acid is added dropwise over the course of about 2 hours. The pH is then adjusted to 6.0 and the reaction mixture is then filtered and the filtrate is collected.

EXAMPLE II

Ten pounds of meat scraps are hydrolyzed and neutralized as in Example I and placed in a reflux vessel and the volume is adjusted to 2 gallons. The mixture is continuously stirred and air-sparged for 4 hours at about 60° C. at a reduced pressure of 20 to 24 inches of mercury. One pound of acetaldehyde is added gradually at the beginning of the reaction, followed by one-half pound of concentrated hydrochloric acid. At the end of the 2 hours, the pH is adjusted to 6.0 and the reaction product is filtered, retaining the filtrate.

EXAMPLE III

Ten pounds of scrap fish are slurried in a minimum amount of water and hydrolyzed with 2 pounds of 75% phosphoric acid. The volume is adjusted to two gallons and 0.1 pound of guaiacol is added. The pH is adjusted to about 4.0 to 5.0, and the mixture is continuously agitated for 4 hours at 60° C. while air is continuously bubbled through the mixture at a rate sufficient that the slurry is maintained in a mobile state throughout the course of the reaction. A total of about 20 cubic feet of air (S.T.P.) is passed through the reaction mixture. The reaction mixture is adjusted to a pH of 6.0, filtered, and the filtrate is collected.

EXAMPLE IV

The product, i.e., the filtrate, of Example III is diluted 100-fold with ordinary tap water and applied to test plants as both a foliar spray and root zone applications, in an amount of 1 ounce per plant at two applications, at about one-fourth and three-fourths of the growth period to maturity after sprouting. At the dilution utilized, each application equals 0.01 to 0.03 gram, on a dry weight basis, of the reaction product of Example III, or 0.1 to 0.4 gram to the filtrate, per plant. Not less than 50 of each type plant was treated, and untreated controls were provided, utilizing not less than 50 plants of each type. In all instances, both controls and treated plants were subjected to identical conditions, as far as possible, of soil, soil preparation, planting, fertilizing, cultivating, and watering. Further, in being grown in near proximity, comparison groups were subject to substantially identical conditions of light, shade, soil, water, air and the like.

Comparative data are shown in Tables I and II. Yield is the weight of harvested fruit or vegetable, the average yield of the untreated controls being designated as 100% for ease of comparison. Similarly, the average time of maturation of the controls was denominated 100%, measured from the time of sprouting. The data are based on standard statistical averages of field crop experiments. Fruits and vegetables were harvested in comparable condition of green maturity or ripeness.

TABLE I.—RELATIVE YIELD

| Crop | Percent Control | Percent Treated |
| --- | --- | --- |
| Tomatoes (Manalucie) | 100 | 127 |
| Cabbage | 100 | 130 |
| Lettuce | 100 | 121 |
| Corn (Golden Bantum) | 100 | 136 |
| Bell pepper | 100 | 140 |
| Beans (pole) | 100 | 130 |

TABLE I.—RELATIVE YIELD

| Crop | Percent Control | Percent Treated |
| --- | --- | --- |
| Tomatoes (Manalucie) | 100 | 82 |
| Strawberries | 100 | 77 |
| Corn (Golden Bantum) | 100 | 85 |
| Bell pepper | 100 | 80 |
| Beans (pole) | 100 | 82 |
| Cabbage | 100 | 86 |

Quantitative microanalysis of the major elements, calcium, potassium, magnesium, and phosphorous, in leaves and stems indicate no determinable difference (on dry weight basis) between treated plants and untreated controls. This finding confirms that the effect of the product of the present invention acts upon the metabolism of plants and is not related to the presence of nutrients contained in the composition. The action is probably related to the initiation or catalysis of metabolic reactions. The product of the present invention is accordingly distinguishable from other growth promotors, such as auxins, which in some instances contain a beta-keto acid group.

EXAMPLE V

While substantial emphasis has been placed upon the growth promoting effect of the product of the present invention, it is not intended to ignore or belittle the surprising and unexpected freeze resistance imparted by the addition of the product. As an illustration Table III illustrates the effect of the addition of the product (filtrate) of Example III, as detailed in Example IV, to tomato and bell pepper plants. One hundred plants (50 each tomato and bell pepper) were treated while the same number of untreated controls were grown under the same conditions.

TABLE III

| | Days applied before freeze | Number of plants surviving | Percent survival |
| --- | --- | --- | --- |
| No. of plants: | | | |
| 100 | 3 | 78 | 78 |
| 100 | Control | 11 | 11 |

It is apparent that a dramatic increase in survival rate is provided by the addition of the product of the present invention.

Whereas the invention has been described in terms of a limited variety of plants, and the like, the product of the present invention is broadly applicable to a wide variety of plants and trees and the invention should be construed broadly to include the many various embodiments and equivalents apparent to one skilled in the art and should be limited only by the following appended claims.

What is claimed is:

1. The process of forming a composition for imparting freeze resistance to and promoting growth of plants comprising hydrolyzing under acid conditions, in an aqueous medium, a proteinaceous material to solubilize at least about two-thirds of the proteins to alpha-amino acids, and subjecting the hydrolyzed material to an oxidation under oxidizing conditions comprising a temperature of about 20 to 80° C., a pH of 1.0 to 4.5, and with continuous agitation in the presence of oxygen for a period of two to eight hours, to convert at least about 0.01 percent of said alpha-amino acids to alpha-keto acids.

2. The process of claim 1 wherein substantially all of the protein is hydrolyzed to a soluble condition.

3. The process of claim 1 wherein the proteinaceous material is proteinaceous waste.

4. The process of claim 3 wherein the proteinaceous waste is trash fish.

5. The process of claim 1 wherein about 0.01 to 10.0% by weight of the amino acids in the hydrolyzed material are oxidized to alpha-keto acids.

6. A composition for treating plants to impart freeze resistance and to promote growth comprising an effective amount of the product of the process of claim 1.

7. A method for treating plants to promote growth and impart freeze resistance comprising applying to the plant or to the root zone soil at least about 0.01 gram, on a dry weight basis, of the product of claim 6 per plant.

8. The method of claim 7 wherein the product is applied in a solution as a foliar spray.

9. The method of claim 7 wherein the product is applied in solid form in admixture with a solid diluent to the root zone soil.

10. A method for treating food crop producing plants and trees to promote growth and impart freeze resistance comprising applying to the root zone soil an amount of from about 0.01 to 0.5 gram, on a dry weight basis, of a composition comprising the product derived by hydrolyzing black mullet with sufficient phosphoric acid to solubilize substantially all the protein of the fish, adding a minor, catalytically active amount of guaiacol, and contacting with air with agitation of the mixture at a temperature of about 20 to 80° C. for a period of about 2 to 8 hours to convert about 0.01 to 10.0 weight percent of the alpha-amino acids to alpha-keto acids.

References Cited

UNITED STATES PATENTS

| | | | |
|---|---|---|---|
| 2,589,287 | 3/1952 | Ryan et al. | 71—18 X |
| 3,592,846 | 7/1971 | Raymond | 71—107 X |

OTHER REFERENCES

Hackh's Chemical Dictionary, 3rd edition (1944), p. 689.

Hackh's Chemical Dictionary, 3rd edition (1944), p. 254.

Franck et al.: "Alpha-oxo Acids in Protein Hydrolyzates," Chem. Abst., vol. 52 (1958).

Meybeck et al.: "Identification of Alpha-Oxo Acids From Hydrolyzates of Proteins Degraded by Light," Chem. Abst., vol. 58 (1963).

Novikov et al.: "Effect of Lowered Temperatures on Thiamine Content in Leaves and Seedlings of Cucumber," Chem. Abst., vol. 64 (1966).

LEWIS GOTTS, Primary Examiner

C. L. MILLS, Assistant Examiner

U.S. Cl. X.R.

71—113, 114, 115; 252—70

Disclaimer 3,712,802.—*Roland S. Grybek* and *Frederick B. Johnston*, Tampa, Fla. COMPOSITION AND METHOD FOR TREATING PLANTS AND TREES. Patent dated Jan. 23, 1973. Disclaimer filed Mar. 18, 1974, by the assignee, *Marketing and Research Services, Inc.*

Hereby disclaims the portion of the term of the patent subsequent to Nov. 27, 1988.

[*Official Gazette April 16, 1974.*]